US012340724B2

(12) United States Patent
He

(10) Patent No.: US 12,340,724 B2
(45) Date of Patent: Jun. 24, 2025

(54) PIXEL ARRANGEMENT STRUCTURE, DISPLAY PANEL, AND GRAYSCALE CONTROL METHOD

(71) Applicant: TCL CHINA STAR OPTOELECTRONICS TECHNOLOGY CO., LTD., Guangdong (CN)

(72) Inventor: Jhenwei He, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/597,668

(22) PCT Filed: Jan. 10, 2022

(86) PCT No.: PCT/CN2022/071052
§ 371 (c)(1),
(2) Date: Jan. 17, 2022

(87) PCT Pub. No.: WO2023/123548
PCT Pub. Date: Jul. 6, 2023

(65) Prior Publication Data
US 2024/0420614 A1 Dec. 19, 2024

(30) Foreign Application Priority Data
Dec. 28, 2021 (CN) ......................... 202111626158.6

(51) Int. Cl.
*G09G 3/20* (2006.01)

(52) U.S. Cl.
CPC ... *G09G 3/2074* (2013.01); *G09G 2300/0452* (2013.01); *G09G 2300/0465* (2013.01);
(Continued)

(58) Field of Classification Search
CPC ......... G09G 3/2074; G09G 2300/0452; G09G 2300/0465; G09G 2320/0233;
(Continued)

(56) References Cited

U.S. PATENT DOCUMENTS

2011/0148837 A1* 6/2011 Govil ................... G02B 26/001
359/291
2012/0299982 A1 11/2012 Inada
2022/0121073 A1* 4/2022 Zhang ............... G02F 1/136286

FOREIGN PATENT DOCUMENTS

CN 104183221 A 12/2014
CN 104795016 A 7/2015
(Continued)

OTHER PUBLICATIONS

International Search Report in International application No. PCT/CN2022/071052,mailed on Sep. 26, 2022.
(Continued)

*Primary Examiner* — Chanh D Nguyen
*Assistant Examiner* — Gloryvid Figueroa-Gibson
(74) *Attorney, Agent, or Firm* — PV IP PC; Wei Te Chung

(57) ABSTRACT

A pixel arrangement structure, a display panel, and a grayscale control method are related. In each pixel group of the pixel arrangement structure, a number of first type pixels is equal to a number of second type pixels. A number of high grayscale sub-pixels, a number of first low grayscale sub-pixels, a number of second low grayscale sub-pixels, and a number of third low grayscale sub-pixels are all equal. For each pixel group, a ratio of the high grayscale sub-pixels to the low grayscale sub-pixels is one to three to improve a display color shift.

20 Claims, 4 Drawing Sheets

(52) U.S. Cl.
CPC ............... *G09G 2320/0233* (2013.01); *G09G 2320/0242* (2013.01); *G09G 2320/028* (2013.01); *G09G 2320/08* (2013.01)

(58) Field of Classification Search
CPC ..... G09G 2320/0242; G09G 2320/028; G09G 2320/08; G09G 3/20; G09G 3/30; G09G 3/2003; G09G 2320/0271; G09F 9/30
USPC .......................................................... 345/694
See application file for complete search history.

(56) References Cited

FOREIGN PATENT DOCUMENTS

| | | | | | |
|---|---|---|---|---|---|
| CN | 108831399 A | | 11/2018 | | |
| CN | 111025791 A | | 4/2020 | | |
| CN | 112180630 A | * | 1/2021 | ........... | G02F 1/1333 |
| CN | 112185313 A | | 1/2021 | | |

OTHER PUBLICATIONS

Written Opinion of the International Search Authority in International application No. PCT/CN2022/071052,mailed on Sep. 26, 2022.

* cited by examiner

PIXEL ARRANGEMENT STRUCTURE, DISPLAY PANEL, AND GRAYSCALE CONTROL METHOD

FIELD OF DISCLOSURE

The present disclosure relates to the field of display technologies, in particular to a pixel arrangement structure, a display panel, and a grayscale control method.

BACKGROUND

With the development of display technologies, a resolution of display panels is also gradually improved. At present, the resolution of the display panel has reached 8K (7680×4320) or higher. Under a condition that a size of the display panel remains unchanged, an effect of increasing the resolution is that an aperture is reduced, thereby reducing a transmittance of the display panel. A traditional viewing angle improvement design solution (8-domain pixel) cannot be applied in higher resolution products due to a loss of the transmittance. Instead, a 4-somain pixel design solution is employed. However, this design also leads to deterioration of viewing angle characteristics, and a viewing angle compensation algorithm is required to improve the viewing angle characteristics.

SUMMARY OF DISCLOSURE

In a traditional viewing angle compensation algorithm, pixels in an effective display area of a display panel are generally distinguished into two states of H (high grayscale value) and L (low grayscale value). When viewed from a side, since the pixels in the L state will reduce a degree of brightness change, the greater the number of pixels in the L state, the better the improvement of a color shift. However, increasing the number of pixels in the L state will affect an image sharpness and cause a granular sensation.

Accordingly, in view of the above technical problems, it is necessary to provide a pixel arrangement structure, a display panel, and a grayscale control method that can improve the color shift.

A pixel arrangement structure includes at least one pixel group. The pixel group includes at least one first type pixel and at least one second type pixel.

The first type pixel includes a high grayscale sub-pixel and a first low grayscale sub-pixel, the second type pixel includes a second low grayscale sub-pixel and a third low grayscale sub-pixel, and a grayscale value of the high grayscale sub-pixel, a grayscale value of the first low grayscale sub-pixel, a grayscale value of the second low grayscale sub-pixel, and a grayscale value of the third low grayscale sub-pixel are different.

In each of the pixel groups, a number of the first type pixels is equal to a number of the second type pixels, a number of the high grayscale sub-pixels, a number of the first low grayscale sub-pixels, a number of the second low grayscale sub-pixels, and a number of the third low grayscale sub-pixels are all equal, and the first type pixel and the second type pixel in each of the pixel groups are arranged in two rows and two columns.

A display panel, where pixels in the display panel are arranged according to a pixel arrangement structure.

The pixel arrangement structure includes at least one pixel group, and the pixel group includes at least one first type pixel and at least one second type pixel.

The first type pixel includes a high grayscale sub-pixel and a first low grayscale sub-pixel, the second type pixel includes a second low grayscale sub-pixel and a third low grayscale sub-pixel, and a grayscale value of the high grayscale sub-pixel, a grayscale value of the first low grayscale sub-pixel, a grayscale value of the second low grayscale sub-pixel, and a grayscale value of the third low grayscale sub-pixel are different.

In each of the pixel groups, a number of the first type pixels is equal to a number of the second type pixels, a number of the high grayscale sub-pixels, a number of the first low grayscale sub-pixels, a number of the second low grayscale sub-pixels, and a number of the third low grayscale sub-pixels are all equal, and the first type pixel and the second type pixel in each of the pixel groups are arranged in two rows and two columns.

A grayscale control method applied to a display panel includes following step.

When the display panel is powered on, pixels in the display panel are controlled to be arranged according to a preset rule. The preset rule is an arrangement according to a pixel arrangement structure;

In embodiments of the present disclosure, the pixel arrangement structure includes the first type pixel and the second type pixel. The first type pixel includes the high grayscale sub-pixel and the first low grayscale sub-pixel. The second type pixel includes the second low grayscale sub-pixel and the third low grayscale sub-pixel. In the pixel arrangement structure, in each pixel group composed of four pixels arranged in two rows and two columns, the number of the first type pixels is equal to the number of the second type pixels, and the number of the high grayscale sub-pixels, the number of the first low grayscale sub-pixels, the number of the second low grayscale sub-pixels, and the number of the third low grayscale sub-pixels are all equal. The grayscale value of the grayscale sub-pixel, the grayscale value of the first low grayscale sub-pixel, the grayscale value of the second low grayscale sub-pixel, and the grayscale value of the third low grayscale sub-pixel are different. Thus, in each pixel group, a ratio of the high grayscale sub-pixels to the low grayscale sub-pixels is one to three to improve a display color shift. Moreover, each pixel group includes low-gray sub-pixels with three different grayscale values to improve a granular sensation.

BRIEF DESCRIPTION OF DRAWINGS

In order to more clearly illustrate the technical solutions of the embodiments of the present disclosure or the prior art, the accompanying drawings that are required to be used in the description of the embodiments or the prior art will be briefly introduced below. Apparently, the drawings in the following description are only some examples of the present disclosure. For those of ordinary skill in the art, other drawings can also be obtained from these drawings without creative efforts.

DETAILED DESCRIPTION

Figure 1:
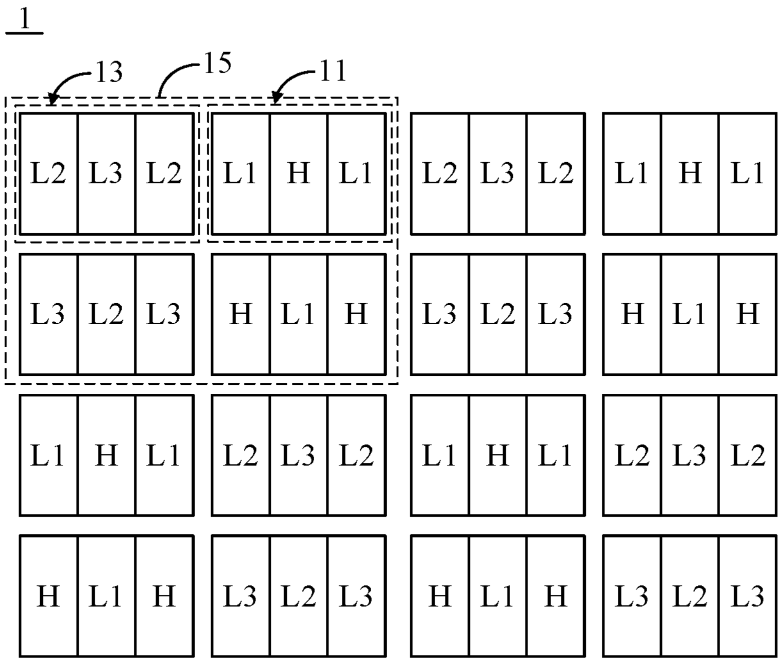
FIG. 1 is a first schematic diagram of a pixel arrangement structure in an embodiment of the present disclosure.

In order to make the purpose, technical solutions, and advantages of the present disclosure more clear, the present disclosure will be further described in detail below with reference to the accompanying drawings and embodiments. It should be understood that the specific embodiments described herein are only used to explain the present disclosure, but not to limit the present disclosure.

The display panel includes a plurality of pixels. The pixels are composed of red, green, and blue sub-pixels. Display effects of display panels formed by different pixel arrangement structure 1 are also different. In order to solve problems of affecting an image sharpness and causing a granular sensation by increasing a number of pixels in an L state in a traditional technology, in one embodiment, as shown in FIG. 1 to FIG. 4, a pixel arrangement structure 1 is provided, including at least one pixel group. The pixel group includes at least one first type pixel 11 and second type pixel 13.

It should be noted that the display panel includes a plurality of pixels. The pixel arrangement structure 1 is formed by arranging pixels according to certain rules. In one example, the pixels include red sub-pixels, green sub-pixels, and blue sub-pixels. The first type pixel 11 and the second type pixel 13 in the pixel arrangement structure 1 of the present disclosure are divided according to what kind of grayscale sub-pixels are included in the pixels. The grayscale refers to a brightness level generated by the sub-pixel after being powered on. It should be noted that the pixel arrangement structure 1 of the present disclosure is an arrangement structure after the pixel arrangement structure 1 is powered on.

The pixels are divided into groups of four adjacent pixels. The four adjacent pixels are arranged in two rows and two columns (equivalent to the four adjacent pixels arranged in a two-by-two matrix). Thus, a pixel group 15 is formed. In other words, first pixels and second pixels included in each pixel group 15 are arranged in two rows and two columns. In order to ensure that the pixel arrangement structure 1 of the present disclosure can improve the color shift, the granular sensation, and the sharpness, in each pixel group 15, a number of the first type pixels 11 and a number of the second type pixels 13 are equal. That is, the number of the first type pixels 11 is two, and the number of the second type pixels 13 is two. Moreover, in each pixel group 15, a number of high grayscale sub-pixels H, a number of first low grayscale sub-pixels L1, a number of second low grayscale sub-pixels L2, and a number of third low grayscale sub-pixels L3 are all equal. That is, the number of the high grayscale sub-pixels H is three, the number of the first low grayscale sub-pixels L1 is three, the number of the second low grayscale sub-pixels L2 is three, and the number of the third low grayscale sub-pixels L3 is three.

In one example, the pixels include red sub-pixels, green sub-pixels, and blue sub-pixels. The high grayscale sub-pixel H includes one red sub-pixel, one green sub-pixel, and one blue sub-pixel. The first low grayscale sub-pixel L1 includes one red sub-pixel, one green sub-pixel, and one blue sub-pixel. The second low grayscale sub-pixel L2 includes one red sub-pixel, one green sub-pixel, and one blue sub-pixel. The third low grayscale sub-pixel L3 includes one red sub-pixel, one green sub-pixel, and one blue sub-pixel.

Exemplarily, the first type pixel 11 includes the high grayscale sub-pixels H and the first low grayscale sub-pixels L1. The second type pixel 13 includes the second low grayscale sub-pixels L2 and the third low grayscale sub-pixels L3. A grayscale value of the high grayscale sub-pixel H, a grayscale value of the first low grayscale sub-pixel L1, a grayscale value of the second low grayscale sub-pixel L2, and a grayscale value of the third low grayscale sub-pixel L3 can be set according to an actual situation, and the following conditions need to be met: the grayscale value of the high grayscale sub-pixel H, the grayscale value of the first low grayscale sub-pixel L1, the grayscale value of the second low grayscale sub-pixel L2, and the grayscale value of the third low grayscale sub-pixel L3 are different. In one example, the grayscale value of the high grayscale sub-pixel H is greater than the grayscale value of the first low grayscale sub-pixel L1. The grayscale value of the first low grayscale sub-pixel L1 is greater than the grayscale value of the second low grayscale sub-pixel L2. The grayscale value of the second low grayscale sub-pixel L2 is greater than the grayscale value of the third low grayscale sub-pixel L3.

Figure 3:
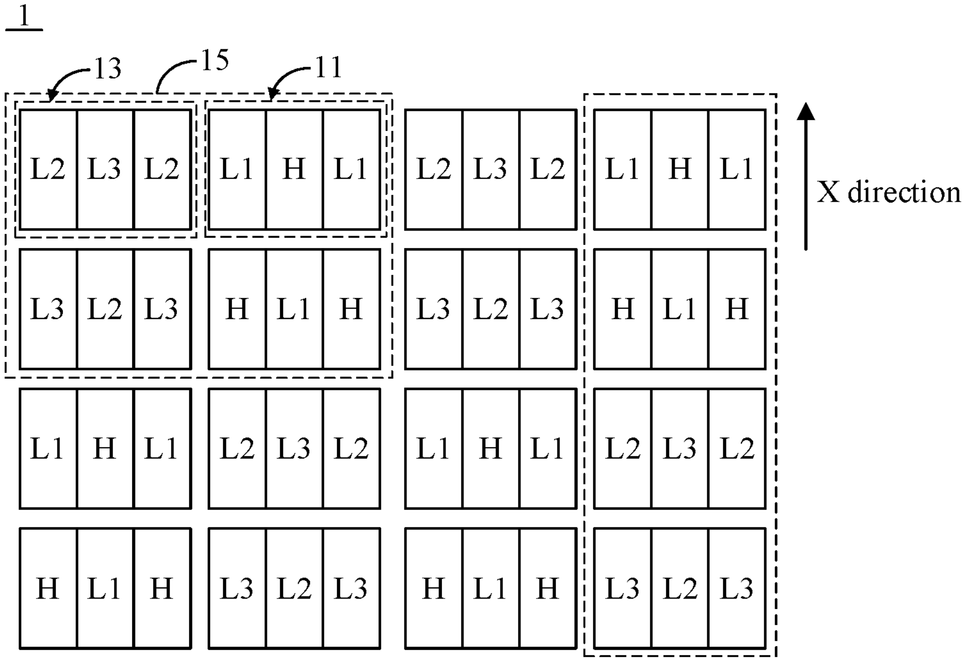
FIG. 3 is a third schematic diagram of a pixel arrangement structure in an embodiment of the present disclosure.

Based on a basic structure of the above pixel arrangement structure 1, at least the following two types of structures can be derived:

A first type structure (the most average chromaticity): as shown in FIG. 1 and FIG. 3, in each pixel group 15, the number of the first type pixels 11 is equal to the number of the second type pixels 13. The number of the high grayscale sub-pixels H, the number of the first low grayscale sub-pixels L1, the number of the second low grayscale sub-pixels L2, and the number of the third low grayscale sub-pixels L3 are all equal. Meanwhile, the first type pixels 11 are arranged in one column, and the second type pixels 13 are arranged in another column. Also, in a column direction of the pixel arrangement structure 1 (e.g., an X direction in FIG. 3), in two adjacent pixel groups 15, the first type pixels 11 are not arranged in a same column, and the second type pixels 13 are not arranged in a same column. In other words, the pixels in the pixel arrangement structure 1 of the present disclosure are arranged in rows and columns, so that the pixel group 15 is also arranged in rows and columns. In the column direction of the pixel arrangement structure 1, in two adjacent pixel groups 15, the first type pixels 11 in one pixel group 15 are arranged in one column, the first type pixels 11 in the other pixel group 15 are arranged in another column, the second type pixels 13 in one pixel group 15 are arranged in one column, and the second type pixels 13 in the other pixel group 15 are arranged in another column.

In order to further make a display chromaticity more uniform, as shown in FIG. 3, in the column direction of the pixel arrangement structure 1, in every four adjacent pixels, a number of the high grayscale sub-pixels H, a number of the first low grayscale sub-pixels L1, a number of the second low grayscale sub-pixels L2, and a number of the third low grayscale sub-pixels L3 are all equal. That is, the number of the high grayscale sub-pixels H is three, the number of the first low grayscale sub-pixels L1 is three, the number of the second low grayscale sub-pixels L2 is three, and the number of the third low grayscale sub-pixels L3 is also three.

In order to further make the display chromaticity more uniform, in each pixel group 15, one first type pixel 11 includes one high grayscale sub-pixel H and two first low grayscale sub-pixels L1. In one example, the high grayscale sub-pixel H is the green sub-pixel, and the two first low grayscale sub-pixels L1 are the red sub-pixel and the blue sub-pixel, respectively. Another first type pixel 11 includes two high grayscale sub-pixels H and one first low grayscale sub-pixel L1. In one example, the first low grayscale sub-pixel L1 is the green sub-pixel, and the two high grayscale sub-pixels H are the red sub-pixel and the blue sub-pixel, respectively. One second type pixel 13 includes one second low grayscale sub-pixel L2 and two third low grayscale sub-pixels L3. In one example, the second low grayscale sub-pixel L2 is the green sub-pixel, and the two third low grayscale sub-pixels L3 are the red sub-pixel and the blue sub-pixel, respectively. Another second type pixel 13 includes two second low grayscale sub-pixels L2 and one third low grayscale sub-pixel L3. In one example, the third low grayscale sub-pixel L3 is the green sub-pixel, and the two second low grayscale sub-pixels L2 are the red sub-pixel and the blue sub-pixel, respectively.

In order to further make the display chromaticity more uniform, the first type pixel 11 including one high grayscale sub-pixel H and two first low grayscale sub-pixels L1 and the second type pixel 13 including two second low grayscale sub-pixels L2 and one third low grayscale sub-pixel L3 are arranged in a same row. Correspondingly, the first type pixel 11 including two high grayscale sub-pixels H and one first low grayscale sub-pixel L1 and the second type pixel 13 including one second low grayscale sub-pixel L2 and two third low grayscale sub-pixels L3 are arranged in a same row.

Figure 2:
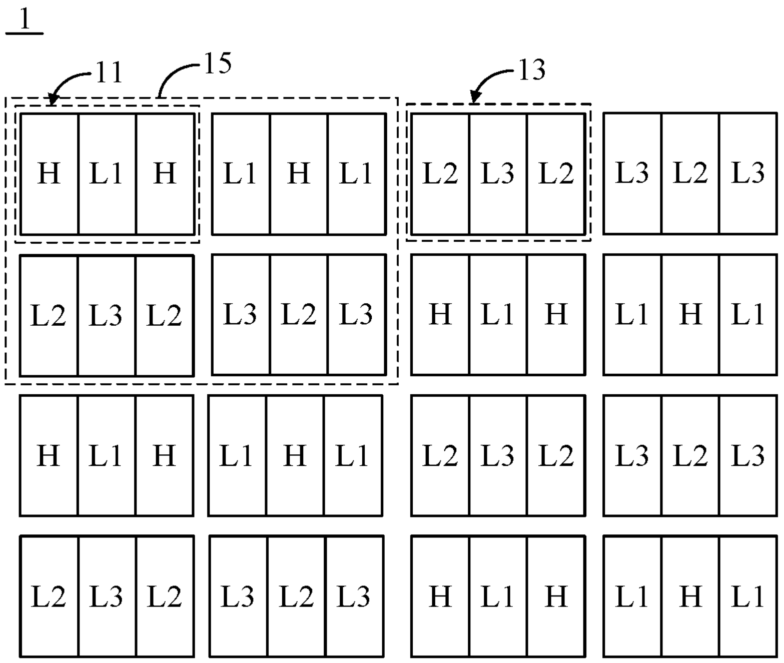
FIG. 2 is a second schematic diagram of a pixel arrangement structure in an embodiment of the present disclosure.
Figure 4:
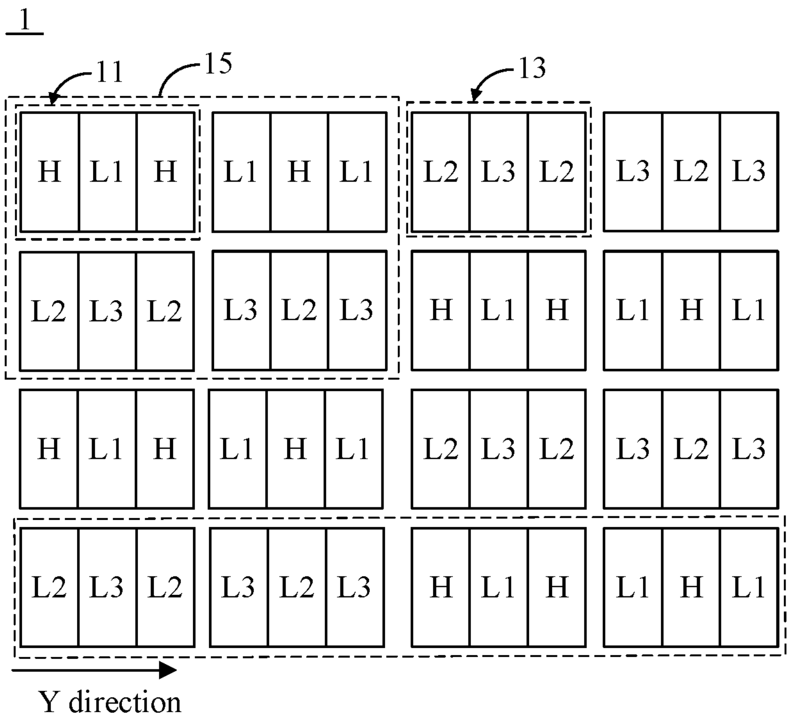
FIG. 4 is a fourth schematic diagram of a pixel arrangement structure in an embodiment of the present disclosure.

A second type structure (the most average brightness): as shown in FIG. 2 and FIG. 4, in each pixel group 15, the number of the first type pixels 11 is equal to the number of the second type pixels 13. The number of the high grayscale sub-pixels H, the number of the first low grayscale sub-pixels L1, the number of the second low grayscale sub-pixels L2, and the number of the third low grayscale sub-pixels L3 are all equal. Meanwhile, the first type pixels 11 are arranged in one row, and the second type pixels 13 are arranged in another row. Also, in a row direction of the pixel arrangement structure 1 (e.g., a Y direction in FIG. 4), in two adjacent pixel groups 15, the first type pixels 11 are not arranged in a same row, and the second type pixels 13 are not arranged in a same row. In other words, the pixels in the pixel arrangement structure 1 of the present disclosure are arranged in rows and columns, so that the pixel group 15 is also arranged in rows and columns. In the row direction of the pixel arrangement structure 1, in two adjacent pixel groups 15, the first type pixels 11 in one pixel group 15 are arranged in one row, the first type pixels 11 in the other pixel group 15 are arranged in another row, the second type pixels 13 in one pixel group 15 are arranged in one row, and the second type pixels 13 in the other pixel group 15 are arranged in another row.

In order to further make a display chromaticity more uniform, as shown in FIG. 4, in the row direction of the pixel arrangement structure 1, in every four adjacent pixels, a number of the high grayscale sub-pixels H, a number of the first low grayscale sub-pixels L1, a number of the second low grayscale sub-pixels L2, and a number of the third low grayscale sub-pixels L3 are all equal. That is, the number of the high grayscale sub-pixels H is three, the number of the first low grayscale sub-pixels L1 is three, the number of the second low grayscale sub-pixels L2 is three, and the number of the third low grayscale sub-pixels L3 is also three.

In order to further make the display chromaticity more uniform, in each pixel group 15, one first type pixel 11 includes one high grayscale sub-pixel H and two first low grayscale sub-pixels L1. In one example, the high grayscale sub-pixel H is the green sub-pixel, and the two first low grayscale sub-pixels L1 are the red sub-pixel and the blue sub-pixel, respectively. Another first type pixel 11 includes two high grayscale sub-pixels H and one first low grayscale sub-pixel L1. In one example, the first low grayscale sub-pixel L1 is the green sub-pixel, and the two high grayscale sub-pixels H are the red sub-pixel and the blue sub-pixel, respectively. One second type pixel 13 includes one second low grayscale sub-pixel L2 and two third low grayscale sub-pixels L3. In one example, the second low grayscale sub-pixel L2 is the green sub-pixel, and the two third low grayscale sub-pixels L3 are the red sub-pixel and the blue sub-pixel, respectively. Another second type pixel 13 includes two second low grayscale sub-pixels L2 and one third low grayscale sub-pixel L3. In one example, the third low grayscale sub-pixel L3 is the green sub-pixel, and the two second low grayscale sub-pixels L2 are the red sub-pixel and the blue sub-pixel, respectively.

In order to further make the display chromaticity more uniform, alternatively, the first type pixel 11 including one high grayscale sub-pixel H and two first low grayscale sub-pixels L1 and the second type pixel 13 including one second low grayscale sub-pixel L2 and two third low grayscale sub-pixels L3 are arranged in a same column. Correspondingly, the first type pixel 11 including two high grayscale sub-pixels H and one first low grayscale sub-pixel L1 and the second type pixel 13 including two second low grayscale sub-pixels L2 and one third low grayscale sub-pixel L3 are arranged in a same column.

In each embodiment of the pixel arrangement structure 1 of the present disclosure includes the first type pixels 11 and the second type pixels 13. The first type pixel 11 includes the high grayscale sub-pixels H and the first low grayscale sub-pixels L1. The second type pixel 13 includes the second low grayscale sub-pixels L2 and the third low grayscale sub-pixels L3. In the pixel arrangement structure 1, in each pixel group 15 composed of four pixels arranged in two rows and two columns, the number of the first type pixels 11 is equal to the number of the second type pixels 13, and the number of the high grayscale sub-pixel H, the number of the first low grayscale sub-pixel L1, the number of the second low grayscale sub-pixel L2, and the number of the third low grayscale sub-pixel L3 are all equal. Moreover, the grayscale value of the grayscale sub-pixel, the grayscale value of the first low grayscale sub-pixel L1, the grayscale value of the second low grayscale sub-pixel L2, and the grayscale value of the third low grayscale sub-pixel L3 are different from each other. Thus, in each pixel group 15, a ratio of the high grayscale sub-pixels H to the low grayscale sub-pixels is one to three, so as to improve the displayed color shift. Moreover, each pixel group 15 includes the low grayscale sub-pixels with three different grayscale values to improve the granular sensation and display viewing angle.

The pixel arrangement structure 1 of the present disclosure is applied to a display panel. A display panel is provided. Pixels in the display panel are arranged according to the pixel arrangement structure 1 as described above.

It should be noted that the pixel arrangement structure in this embodiment is the same as the pixel arrangement structure in each embodiment of the pixel arrangement structure of the present disclosure. For details, refer to each embodiment of the pixel arrangement structure of the present disclosure.

In order to ensure that the display panel has better visual granular sensation, color shift, and display viewing angle, in an example, the pixels in the display panel are divided into two clusters. In one example, the pixels within the two clusters are evenly distributed on the display panel. A number of pixels in both clusters is equal. The pixel arrangement structures 1 of the two clusters are the same or different. For example, the pixel arrangement structures 1 of the two clusters adopt a same pixel arrangement structure 1 in the first type structure or a same pixel arrangement structure 1 in the second type structure, and then the pixel arrangement structures 1 in the two clusters are the same. The pixel arrangement structure 1 in one cluster adopts the pixel arrangement structure 1 in the aforementioned first type structure, and the pixel arrangement structure 1 in the other cluster adopts the pixel arrangement structure 1 in the aforementioned second type structure, and then the pixel arrangement structures 1 in the two clusters are different.

The display panel of the present disclosure has advantages of small color shift, wide viewing angles, and small granular sensation.

In one embodiment, a grayscale control method applied to a display panel is also provided, including the following step:

When the display panel is powered on, pixels of the display panel are controlled to be arranged according to a preset rule. The preset rule is an arrangement according to the above-mentioned pixel arrangement structure.

A controller in the display panel controls a voltage device to provide corresponding voltages to the pixels in the display panel, so that the pixels in the display panel generate corresponding grayscales to be arranged according to the pixel arrangement structure of the present disclosure.

It should be noted that the pixel arrangement structure in this embodiment is the same as the pixel arrangement structure in each embodiment of the pixel arrangement structure of the present disclosure. For details, please refer to each embodiment of the pixel arrangement structure of the present disclosure.

The technical features of the above embodiments can be combined arbitrarily. In order to simplify the description, all possible combinations of the technical features in the above embodiments are not described. However, as long as there is no contradiction in the combination of these technical features, they should be considered to be within the scope of the description in this specification.

The above-mentioned embodiments only express several embodiments of the present disclosure, and the descriptions thereof are relatively specific and detailed, but should not be construed as a limitation on the scope of the patent application. It should be noted that, for those of ordinary skill in the art, several modifications and improvements can be made without departing from the concept of the present disclosure. These all fall within the scope of protection of the present disclosure. Accordingly, the scope of protection of the present disclosure should be determined by the appended claims.

What is claimed is:

1. A pixel arrangement structure, comprising at least one pixel group, wherein the pixel group comprises at least one first type pixel and at least one second type pixel;

the first type pixel comprises a high grayscale sub-pixel and a first low grayscale sub-pixel, the second type pixel comprises a second low grayscale sub-pixel and a third low grayscale sub-pixel, and a grayscale value of the high grayscale sub-pixel, a grayscale value of the first low grayscale sub-pixel, a grayscale value of the second low grayscale sub-pixel, and a grayscale value of the third low grayscale sub-pixel are different;

in each of the pixel groups, a number of the first type pixels is equal to a number of the second type pixels, a number of the high grayscale sub-pixels, a number of the first low grayscale sub-pixels, a number of the second low grayscale sub-pixels, and a number of the third low grayscale sub-pixels are all equal, and the first type pixel and the second type pixel in each of the pixel groups are arranged in two rows and two columns;

wherein in each of the pixel groups, the first type pixels are arranged in one column, and the second type pixels are arranged in another column;

in a column direction of the pixel arrangement structure, in two adjacent pixel groups, the first type pixels are not arranged in a same column, and the second type pixels are not arranged in a same column.

2. The pixel arrangement structure according to claim 1, wherein in the column direction of the pixel arrangement structure, in every four adjacent pixels, a number of the high grayscale sub-pixels, a number of the first low grayscale sub-pixels, a number of the second low grayscale sub-pixels, and a number of the third low grayscale sub-pixels are all equal.

3. The pixel arrangement structure according to claim 1, wherein in each of the pixel groups, one of the first type pixels comprises one high grayscale sub-pixel and two first low grayscale sub-pixels, another one of the first type pixels comprises two high grayscale sub-pixels and one first low grayscale sub-pixel, one of the second type pixels comprises one second low grayscale sub-pixel and two third low grayscale sub-pixels, another one of the second type pixels comprises two second low grayscale sub-pixels and one third low grayscale sub-pixel.

4. The pixel arrangement structure according to claim 3, wherein the first type pixel comprising one high grayscale sub-pixel and two first low grayscale sub-pixels and the second type pixel comprising two second low grayscale sub-pixels and one third low grayscale sub-pixel are arranged in a same row.

5. The pixel arrangement structure according to claim 1, wherein the grayscale value of the high grayscale sub-pixel is greater than the grayscale value of the first low grayscale sub-pixel, the grayscale value of the first low grayscale sub-pixel is greater than the grayscale value of the second low grayscale sub-pixel, and the grayscale value of the second low grayscale sub-pixel is greater than the grayscale value of the third low grayscale sub-pixel.

6. A grayscale control method applied to a display panel, comprising following step:

when the display panel is powered on, controlling pixels in the display panel to be arranged according to a preset rule, wherein the preset rule is an arrangement according to the pixel arrangement structure of claim 1.

7. A pixel arrangement structure, comprising at least one pixel group, wherein the pixel group comprises at least one first type pixel and at least one second type pixel;

the first type pixel comprises a high grayscale sub-pixel and a first low grayscale sub-pixel, the second type pixel comprises a second low grayscale sub-pixel and a third low grayscale sub-pixel, and a grayscale value of the high grayscale sub-pixel, a grayscale value of the first low grayscale sub-pixel, a grayscale value of the second low grayscale sub-pixel, and a grayscale value of the third low grayscale sub-pixel are different;

in each of the pixel groups, a number of the first type pixels is equal to a number of the second type pixels, a number of the high grayscale sub-pixels, a number of the first low grayscale sub-pixels, a number of the second low grayscale sub-pixels, and a number of the third low grayscale sub-pixels are all equal, and the first type pixel and the second type pixel in each of the pixel groups are arranged in two rows and two columns;

wherein in each of the pixel groups, the first type pixels are arranged in one row, and the second type pixels are arranged in another row;

in a row direction of the pixel arrangement structure, in two adjacent pixel groups, the first type pixels are not arranged in a same row, and the second type pixels are not arranged in a same row.

8. The pixel arrangement structure according to claim 7, wherein in the row direction of the pixel arrangement structure, in every four adjacent pixels, a number of the high grayscale sub-pixels, a number of the first low grayscale sub-pixels, a number of the second low grayscale sub-pixels, and a number of the third low grayscale sub-pixels are all equal.

9. The pixel arrangement structure according to claim 7, wherein in each of the pixel groups, one of the first type pixels comprises one high grayscale sub-pixel and two first low grayscale sub-pixel pixels, another one of the first type pixels comprises two high grayscale sub-pixels and one first low grayscale sub-pixel, one of the second type pixels comprises one second low grayscale sub-pixel and two third low grayscale sub-pixels, another one of the second type pixels comprises two second low grayscale sub-pixels and one third low grayscale sub-pixel.

10. The pixel arrangement structure according to claim 9, wherein the first type pixel comprising one high grayscale sub-pixel and two first low grayscale sub-pixels and the second type pixel comprising one second low grayscale sub-pixel and two third low grayscale sub-pixels are arranged in a same column.

11. A display panel, wherein pixels in the display panel are arranged according to the pixel arrangement structure of claim 7.

12. A display panel, wherein pixels in the display panel are arranged according to a pixel arrangement structure;

the pixel arrangement structure comprises at least one pixel group, and the pixel group comprises at least one first type pixel and at least one second type pixel;

the first type pixel comprises a high grayscale sub-pixel and a first low grayscale sub-pixel, the second type pixel comprises a second low grayscale sub-pixel and a third low grayscale sub-pixel, and a grayscale value of the high grayscale sub-pixel, a grayscale value of the first low grayscale sub-pixel, a grayscale value of the second low grayscale sub-pixel, and a grayscale value of the third low grayscale sub-pixel are different;

in each of the pixel groups, a number of the first type pixels is equal to a number of the second type pixels, a number of the high grayscale sub-pixels, a number of the first low grayscale sub-pixels, a number of the second low grayscale sub-pixels, and a number of the third low grayscale sub-pixels are all equal, and the first type pixel and the second type pixel in each of the pixel groups are arranged in two rows and two columns;

wherein in each of the pixel groups, the first type pixels are arranged in one column, and the second type pixels are arranged in another column;

in a column direction of the pixel arrangement structure, in two adjacent pixel groups, the first type pixels are not arranged in a same column, and the second type pixels are not arranged in a same column.

13. The display panel according to claim 12, wherein in each of the pixel groups, the first type pixels are arranged in one column, and the second type pixels are arranged in another column;

in a column direction of the pixel arrangement structure, in two adjacent pixel groups, the first type pixels are not arranged in a same column, and the second type pixels are not arranged in a same column.

14. The display panel according to claim 13, wherein in the column direction of the pixel arrangement structure, in every four adjacent pixels, a number of the high grayscale sub-pixels, a number of the first low grayscale sub-pixels, a number of the second low grayscale sub-pixels, and a number of the third low grayscale sub-pixels are all equal.

15. The display panel according to claim 12, wherein in each of the pixel groups, one of the first type pixels comprises one high grayscale sub-pixel and two first low grayscale sub-pixels, another one of the first type pixels comprises two high grayscale sub-pixels and one first low grayscale sub-pixel, one of the second type pixels comprises one second low grayscale sub-pixel and two third low grayscale sub-pixels, another one of the second type pixels comprises two second low grayscale sub-pixels and one third low grayscale sub-pixel.

16. The display panel according to claim 15, wherein the first type pixel comprising one high grayscale sub-pixel and two first low grayscale sub-pixels and the second type pixel comprising two second low grayscale sub-pixels and one third low grayscale sub-pixel are arranged in a same row.

17. The display panel according to claim 12, wherein in each of the pixel groups, the first type pixels are arranged in one row, and the second type pixels are arranged in another row;

in a row direction of the pixel arrangement structure, in two adjacent pixel groups, the first type pixels are not arranged in a same row, and the second type pixels are not arranged in a same row.

18. The display panel according to claim 17, wherein in the row direction of the pixel arrangement structure, in every four adjacent pixels, a number of the high grayscale sub-pixels, a number of the first low grayscale sub-pixels, a number of the second low grayscale sub-pixels, and a number of the third low grayscale sub-pixels are all equal.

19. The display panel according to claim 17, wherein in each of the pixel groups, one of the first type pixels comprises one high grayscale sub-pixel and two first low grayscale sub-pixel pixels, another one of the first type pixels comprises two high grayscale sub-pixels and one first low grayscale sub-pixel, one of the second type pixels comprises one second low grayscale sub-pixel and two third low grayscale sub-pixels, another one of the second type pixels comprises two second low grayscale sub-pixels and one third low grayscale sub-pixel.

20. The display panel according to claim 12, wherein the display panel is divided into two clusters, a number of pixels in the two clusters is equal, and pixel arrangement structures in the two clusters are the same or different.

* * * * *